Jan. 12, 1965  S. R. McCLURE  3,165,129
MECHANICAL OFF-BEARING MECHANISM
Filed June 7, 1963  2 Sheets-Sheet 1
FIG. 1
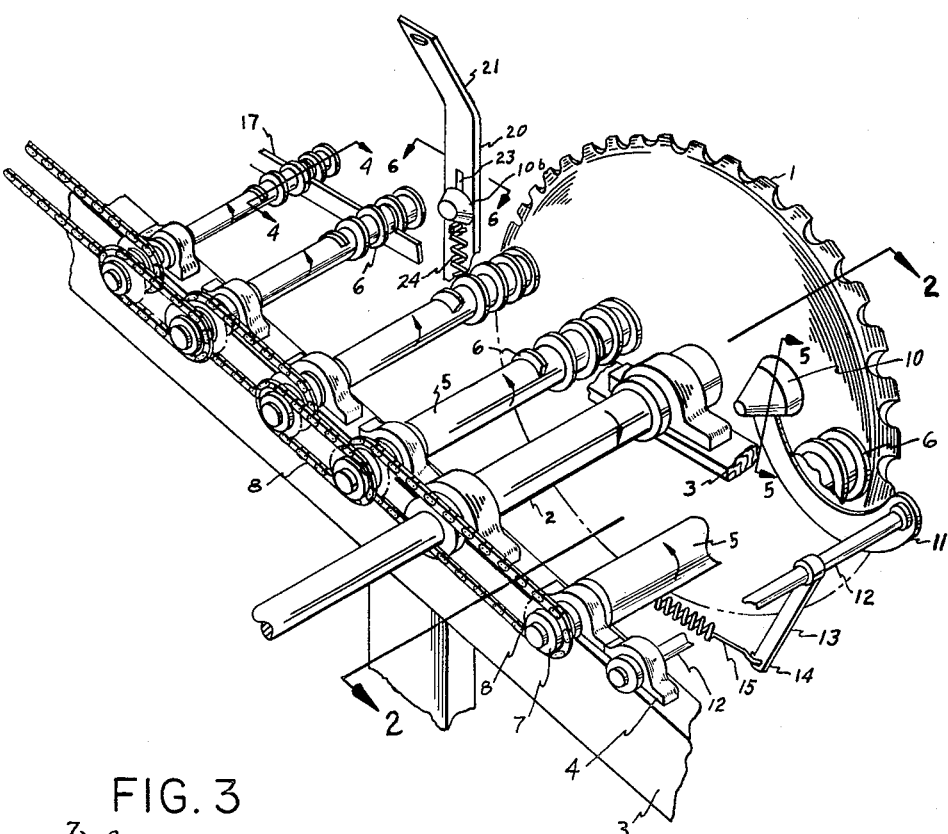
FIG. 3
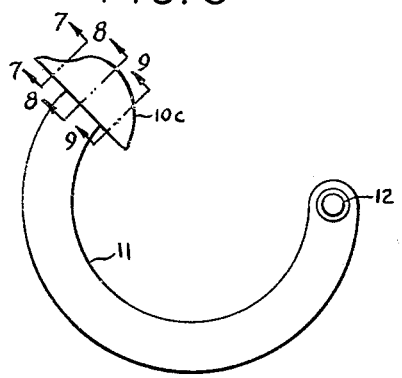
FIG. 7  FIG. 8  FIG. 9
 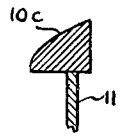
INVENTOR.
BY STANLEY R. McCLURE
ATTORNEY

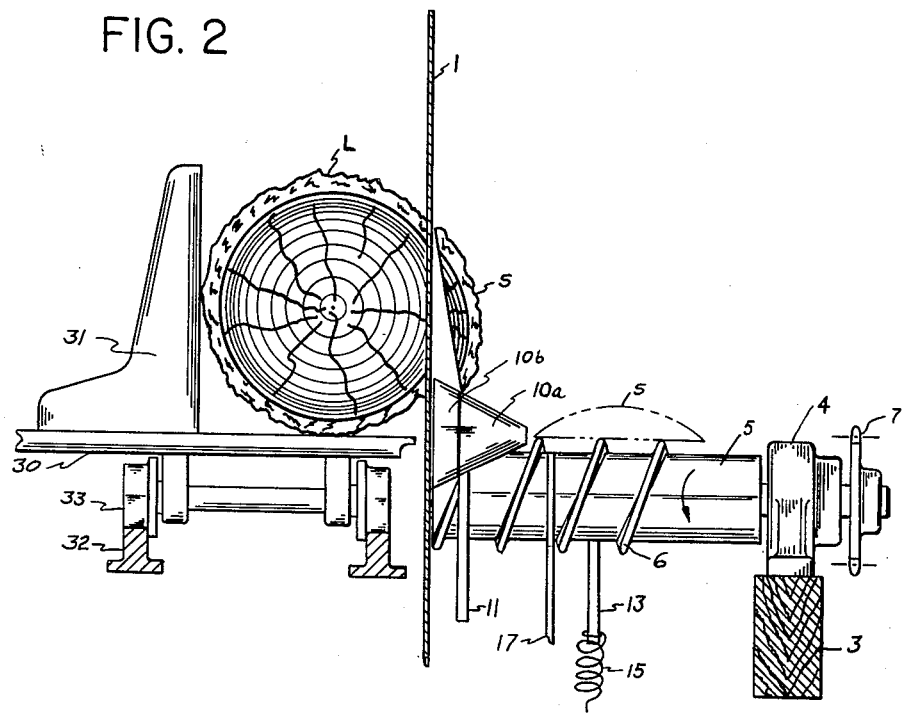
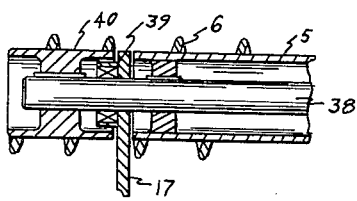
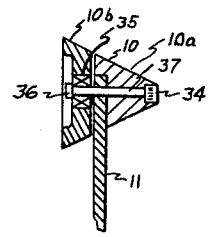
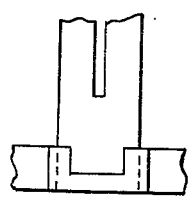
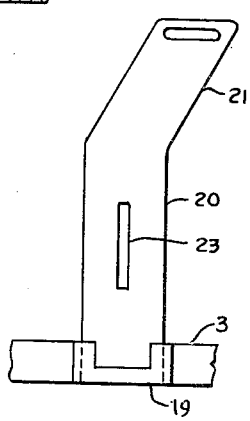
INVENTOR.
BY STANLEY R. McCLURE
ATTORNEY

3,165,129
MECHANICAL OFF-BEARING MECHANISM
Stanley R. McClure, Rowena, Ky.
Filed June 7, 1963, Ser. No. 286,263
6 Claims. (Cl. 143—157)

This invention relates to the sawing of logs and lumber and more particularly to sawing of slabs and of boards from the sides of logs.

It is desirable that slabs and boards, when sawed from logs, be placed with the bark side up in order to enable them to be moved on a conveyor in this position to an edger or other treatment. Ordinarily when slabs or boards are sawed from logs, there is a tendency for the slabs or boards to fall so that they will lie with their sawed face up and bark side down. Due to the fact that the logs sometimes contain branches or knots, this makes conveying of the slabs cut therefrom somewhat difficult. Consequently, it is desirable to provide means whereby the slabs and boards fall onto a conveyor with the sawed face down so that the edger operator does not have to turn the board over to trim the bark from the edge of the boards and move the slabs off of the line.

Various methods have been proposed to achieve this object which have not been altogether satisfactory. In some cases, a stationary shoe with a curved surface has been provided. However, it has been found that such shoes tend to wedge into the saw line and cause the board to be cut unevenly.

An object of the present invention is to provide an improved mechanical means for moving the slabs and boards and causing them to be brought to the desired position with their bark side up without requiring any manual labor.

Another object of this invention is to provide a simple and practical means of the type indicated which can be utilized with logs of various sizes and shapes.

Still another object of this invention is the provision of mechanical means which will properly position the slab or board when severed from the log without wedging into the saw line and causing a board to be cut of unequal thickness.

Other objects will occur to those skilled in the art from the following detailed description.

It should be understood that in the specification and in the appended claims that the word "slab" has been utilized to include a sawed board which has bark at its outer edges. It will be appreciated, of course, that the job of the edger is to saw the bark from the edges of the boards containing it and to remove the slabs from the line. Thus, the invention relates both to sawed boards and slabs and the word "slab" has been used for purposes of simplicity.

Referring now to the drawings, FIG. 1 is a view in perspective of a saw mill assembly embodying my invention.

FIG. 2 is a sectional view taken along lines 2—2 of FIG. 1 which illustrates the log on a carriage and the slab being severed from the log.

FIG. 3 is a side elevation of the rocker arm utilized in the present invention and illustrating further a modified shoe.

FIG. 4 is a horizontal section taken along lines 4—4 of FIG. 1 which illustrates the bearing mechanism of the various rollers.

FIG. 5 is a vertical sectional view taken along lines 5—5 of FIG. 1.

FIG. 6 is taken along lines 6—6 of FIG. 1.

FIGS. 7, 8 and 9 are vertical sections taken along lines 7—7, 8—8 and 9—9 of FIG. 3.

FIG. 10 is a side elevational view of the splitter members 20 illustrating the angular direction of the terminal end of the splitter.

In the drawings, the circular saw 1 is shown mounted on mandrel 2 which, in turn, is supported on the support or husk 3. The corresponding husk adjacent the saw has been broken away for purposes of clarifying the drawing. Mounted in the same manner before and after the mandrel are powered rollers 5 held in position by large pillow blocks 4 attached to the husk 3. Each of the rollers contains a series of spiraled flights 6 which run for less than one-half of the length of the roller. The rollers are driven by chain 8 attached to sprockets 7 of each of the rollers which, in turn, is driven by a driving chain not shown. Adjacent to the saw 1 is shoe 10 which in one instance is supported on rocker arm 11 which is attached by means of a shaft 12 to an arm 13 resiliently supported by spring 15 attached through eye 14 of said arm. This shoe has been illustrated as a conical roller but may be a non-rotatable member as illustrated in FIG. 3. Another shoe 10 is spring loaded into splitter 20 and is held in position by spring 24 located in slot 23. The splitter member is bent toward the top at an angle parallel to the path of the carriage (FIG. 10) so as to avoid contact with the major portion of the end of the log. The terminal portion of the splitter is designated 21. The splitter 20 fits into bracket 19 on the back of husk 3 (FIG. 6) and is thus removable. All of the rollers 5 are supported by a bearing plate 17 which is best illustrated in FIG. 4. In this figure it will be noted that the roller surface 5 is keyed onto shaft 38 which, in turn, is journaled in bearings 39 contained in bearing housing 40. This allows for almost frictionless rotation of said rollers. In the shoe illustrated in FIG. 1 I have utilized a cone member containing a rotatable portion 10b and a stationary portion 10a. As is best shown in FIG. 5, the two portions are secured together by bolt 37 containing a head 36 and a nut 34. The shaft, in turn, is journaled in the bearings 35 so that the inner portion 10b of the cone is rotatable. However, I have found that the shoe need not be rotatable nor in the shape of a cone but may be in the form of an inclined plane having a curved surface at either end as is illustrated in FIG. 3. In this case, the shoe is curved upwardly and at both ends so that the slab does not run into a flat surface but slides over the inclined edges of said shoe.

In FIG. 2 a conventional carriage 30 is illustrated having an adjustable knee 31 and flanged wheels 33 running on trackway 32. The log itself is illustrated by the letter L and the slab by the letter S. It will be noticed that as the slab is cut from the board it slides down the inclined surface of the cone of the shoe 10 and is then engaged by a spiraled flight 6 on the roller and is thrown outwardly to land on the rollers bark side up. The resilient means illustrated by springs 15 and 24 allow for the shoes to ride at the lower surface of the saw line without at the same time wedging into the saw line to cause the slab to be cut crookedly. Further, by use of the resilient spring members the assembly automatically adjusts for any size of log which might be cut and for successive boards which, due to the circumference of the log, have a saw line at a lower level than that of the slab.

It will thus be seen that I have provided a simple and economical means whereby the slabs and sawed boards are automatically positioned onto a powered conveyor for further treatment. Other modifications will occur to those skilled in the art and my invention is not to be limited to the description contained herein but is to be commensurate in scope with the appended claims.

I claim:
1. For use with a saw mill assembly, adapted to cut slabs from logs which contains:
 (1) a reciprocating log moving carriage and
 (2) a saw vertically disposed adjacent to the path of said carriage;
a mechanical off-bearing assembly for positioning a severed slab bark side up which comprises:
 (a) a series of powered rollers arranged with their axes perpendicular to the path of said carriage and located on the off side of the saw relative to said carriage,
 (b) at least two self-adjusting and non-wedging shoes located behind the cutting edge of said saw and adjacent to the saw line on the off side but out of rubbing contact with said saw in which
  (i) each shoe has a straight vertical surface on the side adjacent the saw and a surface which is curved tangentially toward the top of the shoe on the side located on the off side of the saw, said shoe increasing in thickness from the top edge toward the middle and from the front edge toward the middle;
  (ii) each shoe is resiliently mounted out of contact with said rollers to follow the lowermost sawed surface of the slab without wedging in the saw line so that the severed slab will slide down the curved surface of each shoe and then outwardly on said rollers bark side up.

2. A mechanical off-bearing assembly as defined in claim 1 which is combined further with a splitter member located behind the saw in the path of the saw line, in which said splitter member contains a vertical body portion and a terminal portion, said terminal portion being angularly inclined parallel to the path of said carriage away from said saw.

3. A mechanical off-bearing assembly as defined in claim 2 in which the body portion of said splitter member contains a slot, the combination therewith of a spring mounted in said slot and a shoe operatively connected to said spring.

4. A mechanical off-bearing assembly as defined in claim 1 in which the shoes are of a conical shape.

5. A mechanical off-bearing mechanism as defined in claim 1 in which at least one of the shoes is in the form of a truncated cone.

6. A mechanical off-bearing mechanism as defined in claim 1 in which at least one of the shoes is in the form of a cone rotatably mounted on a resiliently mounted shaft.

References Cited by the Examiner
UNITED STATES PATENTS

| | | | |
|---|---|---|---|
| 194,259 | 8/77 | Overhiser | 143—157 |
| 1,299,752 | 4/19 | Malcomb. | |
| 1,867,873 | 7/32 | Browne. | |
| 2,821,301 | 1/58 | Montague. | |
| 3,017,909 | 1/62 | Bowling et al. | |

WILLIAM W. DYER, JR., *Primary Examiner.*